United States Patent
Snyder et al.

(10) Patent No.: US 10,436,039 B2
(45) Date of Patent: Oct. 8, 2019

(54) GAS TURBINE ENGINE TURBINE BLADE TIP COOLING

(71) Applicant: United Technologies Corporation, Farmington, CT (US)

(72) Inventors: Brooks E. Snyder, Glastonbury, CT (US); Thomas N. Slavens, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 593 days.

(21) Appl. No.: 15/032,736

(22) PCT Filed: Oct. 10, 2014

(86) PCT No.: PCT/US2014/060072
§ 371 (c)(1),
(2) Date: Apr. 28, 2016

(87) PCT Pub. No.: WO2015/069411
PCT Pub. Date: May 14, 2015

(65) Prior Publication Data
US 2016/0265366 A1     Sep. 15, 2016

Related U.S. Application Data

(60) Provisional application No. 61/902,497, filed on Nov. 11, 2013.

(51) Int. Cl.
*F01D 5/18*     (2006.01)
*F01D 5/20*     (2006.01)
(Continued)

(52) U.S. Cl.
CPC ............. *F01D 5/187* (2013.01); *B22D 25/02* (2013.01); *B22F 3/1055* (2013.01); *B22F 5/04* (2013.01);
(Continued)

(58) Field of Classification Search
CPC ... F01D 5/187; F01D 5/20; B22F 5/04; F05D 2260/202; F05D 2240/307
See application file for complete search history.

(56) References Cited

U.S. PATENT DOCUMENTS 3,496,722 A * 2/1970 Robins ...................... F23R 3/08
                                                    60/757
3,845,620 A * 11/1974 Kenworthy ............... F23R 3/08
                                                    60/757
(Continued)

FOREIGN PATENT DOCUMENTS

| DE | 19944923 | 3/2001 |
|---|---|---|
| EP | 1764477 | 3/2007 |
| EP | 2666968 | 11/2013 |

OTHER PUBLICATIONS

International Preliminary Report on Patentability for PCT Application No. PCT/US2014/060072 dated May 26, 2016.
(Continued)

*Primary Examiner* — Justin D Seabe
*Assistant Examiner* — Adam W Brown
(74) *Attorney, Agent, or Firm* — Carlson, Gaskey & Olds, P.C.

(57) ABSTRACT

A gas turbine engine component includes a structure having a surface configured to be exposed to a hot working fluid. The surface includes a recessed pocket that is circumscribed by an overhang. At least one cooling groove is provided by the overhang.

16 Claims, 4 Drawing Sheets

(51) Int. Cl.
- *B22F 3/105* (2006.01)
- *B22F 5/04* (2006.01)
- *B22F 7/08* (2006.01)
- *B23K 26/342* (2014.01)
- *B22D 25/02* (2006.01)
- *B23K 15/00* (2006.01)
- *B33Y 10/00* (2015.01)
- *B33Y 80/00* (2015.01)

(52) U.S. Cl.
CPC ............ *B22F 7/08* (2013.01); *B23K 15/0086* (2013.01); *B23K 26/342* (2015.10); *F01D 5/20* (2013.01); *B33Y 10/00* (2014.12); *B33Y 80/00* (2014.12); *F05D 2220/32* (2013.01); *F05D 2230/211* (2013.01); *F05D 2230/22* (2013.01); *F05D 2230/31* (2013.01); *F05D 2240/307* (2013.01); *F05D 2250/10* (2013.01); *F05D 2260/201* (2013.01); *F05D 2260/202* (2013.01); *Y02P 10/295* (2015.11)

(56) References Cited

U.S. PATENT DOCUMENTS

| | | | |
|---|---|---|---|
| 4,096,766 A | 6/1978 | Pardo et al. | |
| 4,142,824 A | 3/1979 | Andersen | |
| 4,380,906 A * | 4/1983 | Dierberger | F23R 3/08 60/757 |
| 4,869,645 A * | 9/1989 | Verpoort | B22D 19/00 416/241 R |
| 4,896,510 A * | 1/1990 | Foltz | F23M 5/085 60/757 |
| 5,515,680 A * | 5/1996 | Fujimura | B01F 5/0405 239/434 |
| 6,558,119 B2 | 5/2003 | Lee et al. | |
| 7,740,445 B1 * | 6/2010 | Liang | F01D 5/187 415/173.5 |
| 7,866,950 B1 | 1/2011 | Wilson, Jr. | |
| 7,997,865 B1 | 8/2011 | Liang | |
| 8,043,058 B1 * | 10/2011 | Liang | F01D 5/187 415/173.1 |
| 8,047,789 B1 | 11/2011 | Liang | |
| 8,057,183 B1 | 11/2011 | Liang | |
| 8,066,483 B1 | 11/2011 | Liang | |
| 8,066,485 B1 * | 11/2011 | Liang | F01D 5/186 415/115 |
| 8,109,726 B2 | 2/2012 | Liang | |
| 8,162,609 B1 | 4/2012 | Liang | |
| 8,182,221 B1 * | 5/2012 | Liang | F01D 5/087 415/115 |
| 8,234,872 B2 * | 8/2012 | Berry | F23R 3/04 239/590.3 |
| 8,317,475 B1 | 11/2012 | Downs | |
| 8,322,988 B1 | 12/2012 | Downs et al. | |
| 8,647,071 B2 * | 2/2014 | Pons | F01D 5/20 415/173.1 |
| 8,701,419 B2 * | 4/2014 | Hughes | F23R 3/286 60/772 |
| 9,605,545 B2 * | 3/2017 | Grohens | F01D 5/141 |
| 9,671,112 B2 * | 6/2017 | Chila | F23R 3/286 |
| 2002/0197159 A1 * | 12/2002 | Roeloffs | F01D 5/186 416/92 |
| 2007/0059173 A1 * | 3/2007 | Lee | F01D 5/20 416/97 R |
| 2008/0060197 A1 * | 3/2008 | Lee | B23P 6/007 29/889.721 |
| 2010/0003619 A1 | 1/2010 | Das et al. | |
| 2011/0232299 A1 * | 9/2011 | Stryapunin | F23R 3/04 60/806 |
| 2011/0255990 A1 * | 10/2011 | Diamond | F01D 5/20 416/97 R |
| 2012/0034101 A1 * | 2/2012 | James | F01D 5/20 416/96 R |
| 2012/0189427 A1 | 7/2012 | Kwon et al. | |
| 2012/0222306 A1 | 9/2012 | Mittendorf et al. | |
| 2013/0266454 A1 | 10/2013 | Mongillo, Jr. et al. | |

OTHER PUBLICATIONS

The Extended European Search Report for EP Application No. 14860261.8, dated May 30, 2017.

International Search Report and Written Opinion for PCT Application No. PCT/US2014/060072, dated Jan. 15, 2015.

\* cited by examiner

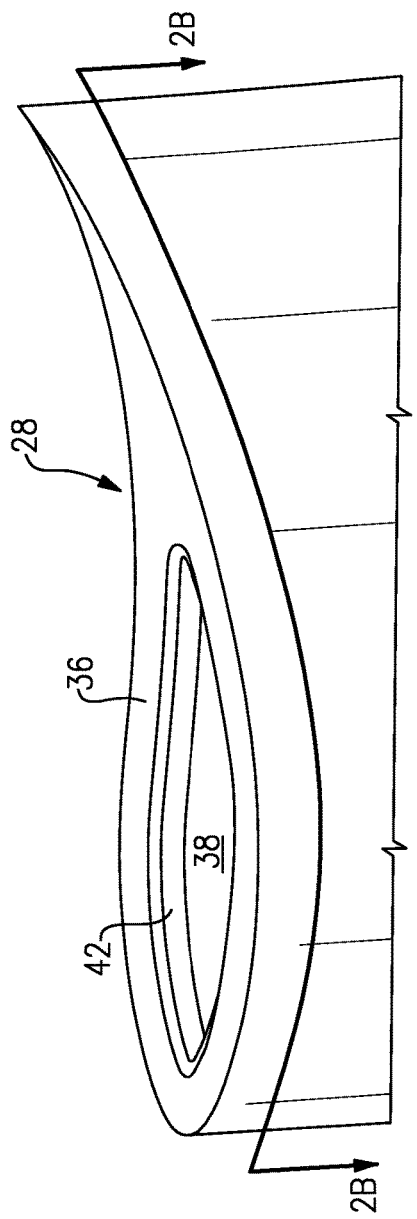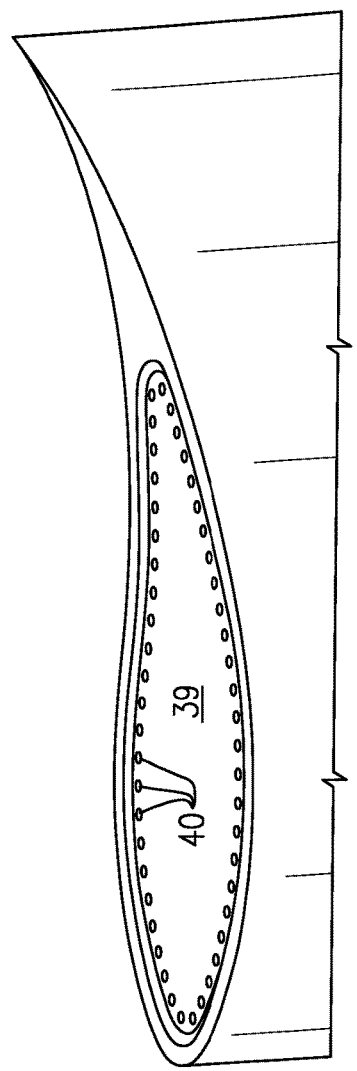
FIG.2A
FIG.2B

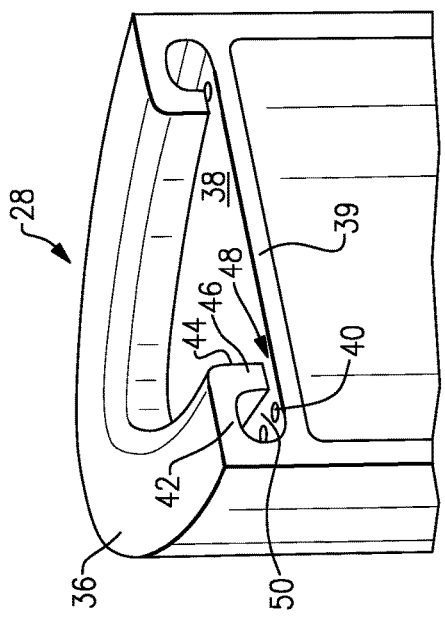
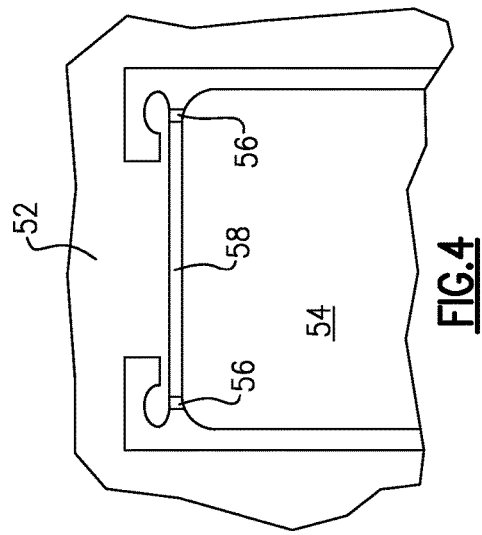
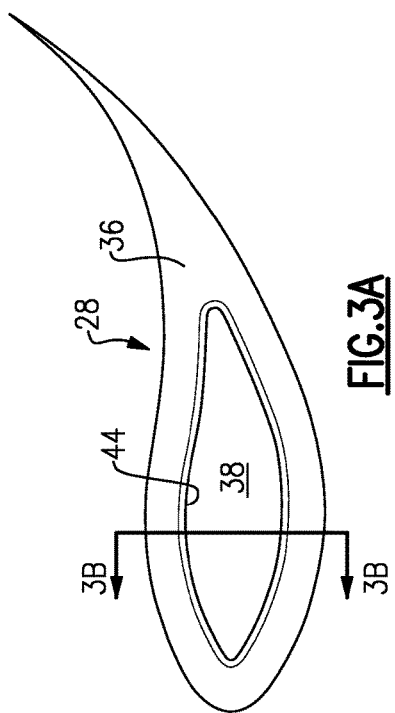
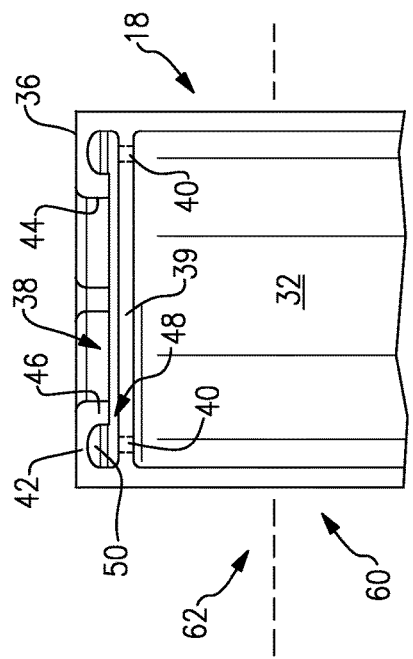
FIG.3A
FIG.3B
FIG.3C
FIG.4

GAS TURBINE ENGINE TURBINE BLADE TIP COOLING

CROSS-REFERENCE TO RELATED APPLICATIONS

This application claims priority to U.S. Provisional Application No. 61/902,497, which was filed on Nov. 11, 2013 and is incorporated herein by reference.

BACKGROUND

This disclosure relates to a gas turbine engine. More particularly, the disclosure relates to a tip cooling configuration for an airfoil.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In the pursuit of ever higher efficiencies, gas turbine manufacturers have long relied on higher and higher turbine inlet temperatures to provide boosts to overall engine performance. In typical modern engine applications the gas path temperatures within the turbine exceed the melting point of the component constituent materials. Due to this, dedicated cooling air is extracted from the compressor and used to cool the gas path components in the turbine incurring significant cycle penalties.

Turbine blades typically include internal cooling passages. Film cooling holes communicate cooling fluid from the cooling passages to high temperature areas on the exterior surface of the turbine blade that may experience undesirably high temperatures. One high temperature area is the tip of the airfoil.

SUMMARY

In one exemplary embodiment, a gas turbine engine component includes a structure having a surface configured to be exposed to a hot working fluid. The surface includes a recessed pocket that is circumscribed by an overhang. At least one cooling groove is provided by the overhang.

In a further embodiment of the above, the cooling channel exits through a continuous channel into the recessed pocket.

In a further embodiment of any of the above, the cooling channel exits through discontinuous channels into the recessed pocket.

In a further embodiment of any of the above, the component includes at least one discrete hole that is in fluid communication with the groove and is configured to provide a cooling fluid to the pocket.

In a further embodiment of any of the above, the structure is an instrumentation probe.

In a further embodiment of any of the above, the structure is an airfoil.

In a further embodiment of any of the above, the airfoil includes a cast first portion, and a second portion is secured to the first portion, the second portion providing the overhang.

In a further embodiment of any of the above, the second portion is additively manufactured.

In a further embodiment of any of the above, the overhang circumscribes the pocket.

In a further embodiment of any of the above, the overhang includes a lip that provides an interior perimeter of the pocket. The groove is provided between the overhang and the end wall. The groove is bounded by the lip.

In a further embodiment of any of the above, the overhang substantially encloses the groove and provides an exit that fluidly interconnects the groove with the pocket.

In a further embodiment of any of the above, the exit is provided radially between the lip and the end wall.

In a further embodiment of any of the above, the pocket is teardrop-shaped.

In a further embodiment of any of the above, the overhang and an adjacent wall encloses the groove.

In another exemplary embodiment, a method of manufacturing a turbine blade airfoil, includes the step of forming a structure having a surface configured to be exposed to a hot working fluid, forming a surface comprising a recessed pocket, forming an overhang that circumscribes the recessed pocket which includes at least one cooling groove provided by the overhang, and using an additive manufacturing process to create a negative for casting of features for at least one of the steps.

In a further embodiment of the above, wherein the forming steps are performed by directly successively adding layers of metal powder joined by local directed energy such as direct laser metal sintering, selective laser metal melting, or electron beam melting. The using step is replaced by an injection molded ceramic core or stamped refractory metal negative for casting of features for at least one of the forming steps. The using step further includes successively adding layers of metal powder to a partially cast component for construction of at least one of the forming steps.

In a further embodiment of the above, the method includes additively manufacturing at least one core that provides a cavity that has an airfoil shape that corresponds to the airfoil. The forming step includes casting the airfoil within the cavity.

In a further embodiment of any of the above, the forming step includes casting a first airfoil portion, and additively manufacturing a second airfoil portion onto the first airfoil portion. The second airfoil portion provides the overhang.

In another exemplary embodiment, a method of manufacturing a gas turbine engine component, includes the steps of forming step a first airfoil portion, and additively manufacturing a second airfoil portion onto the first airfoil portion, the second airfoil portion including a recessed pocket that is circumscribed by an overhang, and at least one cooling groove provided by the overhang.

In a further embodiment of any of the above, the first airfoil portion is cast.

BRIEF DESCRIPTION OF THE DRAWINGS

The disclosure can be further understood by reference to the following detailed description when considered in connection with the accompanying drawings wherein:

FIG. 2A is an enlarged perspective view of an airfoil tip.

FIG. 2B is a cross-sectional view through the tip taken along lines 2B-2B in FIG. 2A.

FIG. 3A is a top elevational view of the airfoil tip shown in FIG. 2A.

FIG. 3B is a cross-sectional perspective view of the tip taken along line 3B-3B of FIG. 3A.

FIG. 3C is a cross-sectional end view of the tip shown in FIG. 3B.

FIG. 4 is a schematic view of a mold used in forming the airfoil shown in FIG. 3B.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

The disclosed cooling configuration may be used in various gas turbine engine applications. A gas turbine engine uses a compressor section that compresses air. The compressed air is provided to a combustor where the compressed air and fuel is mixed and burned. The hot combustion gases pass over a turbine to provide work that may be used for thrust or driving another system component. Many of the engine components, such as blades, vanes, combustor and exhaust liners, blade outer air seals and instrument probes, are subjected to very high temperatures such that cooling may become necessary. The disclosed cooling configuration and manufacturing method may be used for any gas turbine engine component. For exemplary purposes, a turbine blade 10 is described.

Figure 1A:
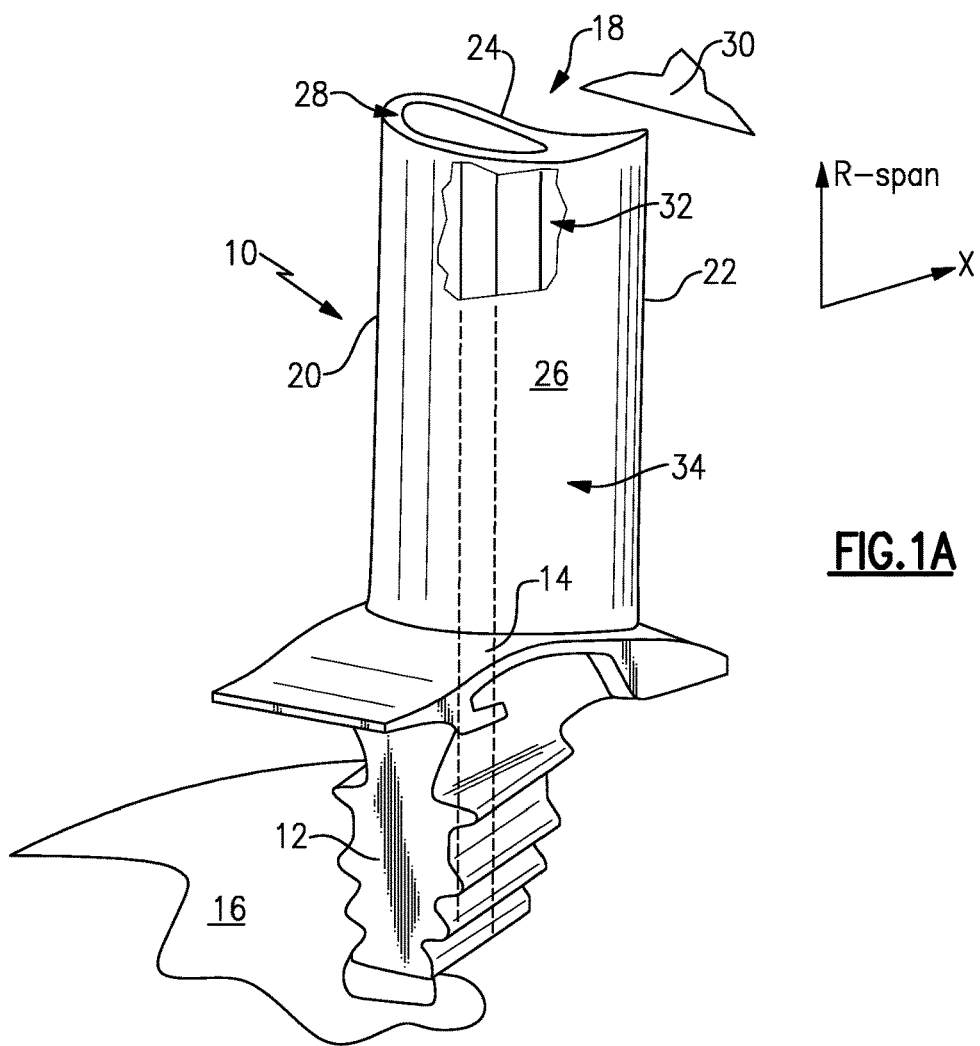
FIG. 1A is a perspective view of the airfoil having the disclosed cooling passage.
Figure 1B:
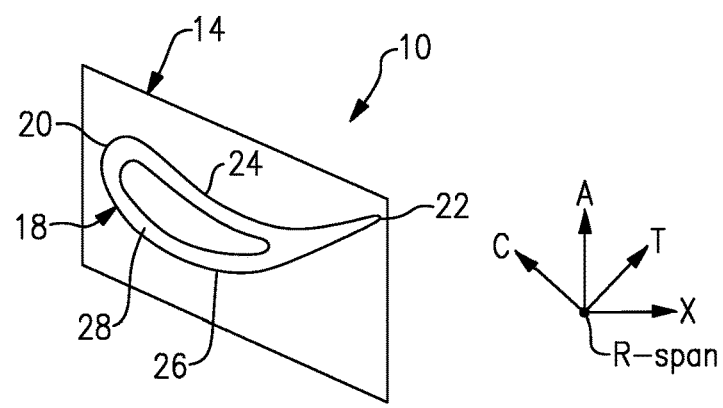
FIG. 1B is a plan view of the airfoil illustrating directional references.

Referring to FIGS. 1A and 1B, a root 12 of each turbine blade 10 is mounted to the rotor disk 16. The turbine blade 10 includes a platform 14, which provides the inner flow path, supported by the root 12. An airfoil 18 extends in a radial direction R from the platform 14 to a tip 28. It should be understood that the turbine blades may be integrally formed with the rotor such that the roots are eliminated. In such a configuration, the platform is provided by the outer diameter of the rotor. The airfoil 18 provides leading and trailing edges 20, 22. The tip 28 is arranged adjacent to a blade outer air seal 30.

The airfoil 18 of FIG. 1B somewhat schematically illustrates exterior airfoil surface extending in a chord-wise direction C from a leading edge 20 to a trailing edge 22. The airfoil 18 is provided between pressure (typically concave) and suction (typically convex) wall 24, 26 in an airfoil thickness direction T, which is generally perpendicular to the chord-wise direction C. Multiple turbine blades 10 are arranged circumferentially in a circumferential direction A. The airfoil 18 extends from the platform 14 in the radial direction R, or spanwise, to the tip 28.

The airfoil 18 includes a cooling passage 32 provided between the pressure and suction walls 20, 22. The exterior airfoil surface 34 may include multiple film cooling holes (not shown) in fluid communication with the cooling passage 32.

Referring to FIGS. 2A-3C, the tip 28 includes an end face 36, which is configured to be adjacent to the BOAS. A pocket 38 is provided in the tip 28. An overhang 42 circumscribes the pocket 38 and provides the end face 36. The overhang 42 forms an interior perimeter 44 arranged within the pocket 38. As best shown in FIGS. 3B-3C, the overhang 42 includes a radially inwardly extending lip 46, which forms a groove 50 that is substantially enclosed by the overhang 42. An exit 48 is provided between the lip 46 and the end wall 39.

At least one cooling hole 40, round or shaped, extend through the end wall 39 in a generally radial direction to fluidly interconnect the cooling passage 32 and the groove 50. The holes 40 can be oriented in other directions, if desired. An impingement cooling flow is provided through the at least one hole 40 into the groove 50 and onto the overhang 42, which cools the end face 36. Cooling fluid within the groove is permitted to pass through the exit 48 and into the pocket 38.

The at least one discrete holes lie around the tip cap and are angled to the most optimal impingement location along the tip region. The holes would be angled such that they impinge on the interior of the cavity while balancing degradation effects of their impingement angle. The post impingement air pressurizes the cavity. The air then ejects through the blade tip such that the pocket 38 acts as a traditional blade tip film cooling.

The cooling configuration employs relatively complex geometry that cannot be formed by traditional casting methods. To this end, additive manufacturing techniques may be used in a variety of ways to manufacture an airfoil with the disclosed cooling configuration. In one example, as schematically illustrated in FIG. 3C, a first portion 60 of the airfoil 18 may be formed by a typical casting technique. The tip 28 of the airfoil may be formed by additively manufacturing a second portion 62 in which the remaining tip is deposited directly on to the casting portion 60. For example, the cast blade is placed into a fixture within a powder-bed additive machine (such as an EOS 280) and the last 10% of the blade is directly additively manufactured.

Other manufacturing techniques are schematically illustrated in FIG. 4. This core could be constructed using a variety of processes such as photo-polymerized ceramic, electron beam melted powder refractory metal, or injected ceramic based on an additively built disposable core die. The core and/or shell molds for the airfoils are first produced using a layer-based additive process such as LAMP from Renaissance Systems. Further, the core could be made alone by utilizing EBM of molybdenum powder in a powder-bed manufacturing system.

A ceramic outer mold 52 and interior core mold 54 may be additively manufactured separately or as one piece to form a cavity 58 providing an airfoil shape. Molten metal is cast into cavity 58 to form the airfoil 18. Pins 56 interconnect the outer mold 52 and interior core mold 54 to provide the correspondingly shaped cooling holes.

Figure 5:
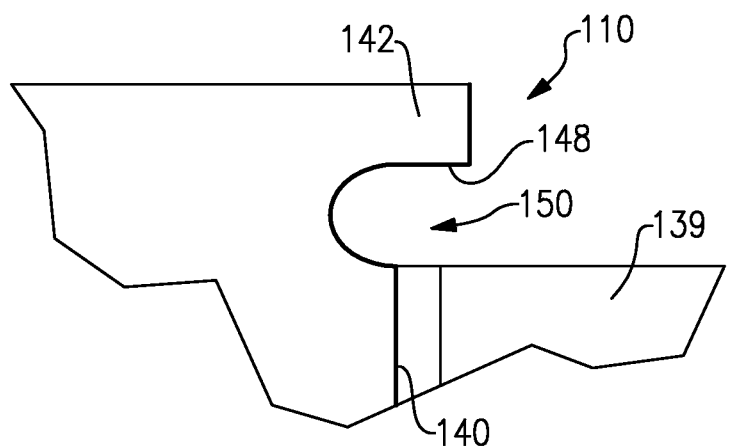
FIG. 5 is a schematic view of a gas turbine engine component having an overhang arranged above a groove.

FIG. 5 illustrates a component 110 having an overhang 142 spaced from a wall 139 to provide a groove 150. A cooling hole 140 is in fluid communication with the groove 150, which provides an exit 148 without a lip.

Figure 6:
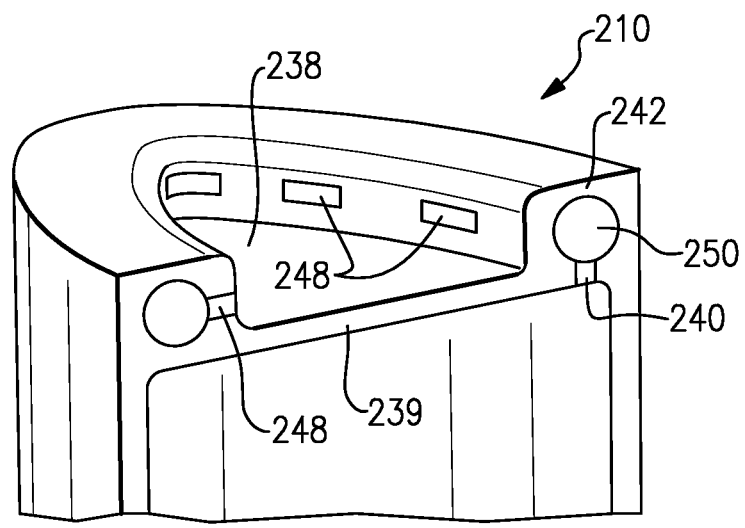
FIG. 6 is a schematic view of a gas turbine engine component having an overhang enclosing a groove.

Another component 210 is shown in FIG. 6. The component 210 includes a groove 250 enclosed by the overhang 242 and the wall 239. A cooling hole 240 communicates cooling fluid to the groove 250. Fluid enters the pocket 238 through exits 248, which may be provided by slots, for example.

The cooling configuration provides increased engine efficiency through a realizable turbine blade cooling configuration with increased effectiveness of blade tip cooling. The shaped channel design provides cold wall surface area allowing for internal convection, increasing effectiveness over a normal tip cooling configuration.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine component comprising:
   a structure having a surface configured to be exposed to a hot working fluid, the surface includes a recessed pocket that is circumscribed by an overhang having a radially inwardly extending lip that provides an interior perimeter of the pocket, and at least one cooling groove provided by the overhang, wherein the structure is an airfoil.

2. The component according to claim 1, wherein cooling fluid exits through a continuous channel into the recessed pocket.

3. The component according to claim 1, wherein cooling fluid exits through discontinuous channels into the recessed pocket.

4. The component according to claim 1, comprising at least one discrete hole in fluid communication with the groove and configured to provide a cooling fluid to the pocket.

5. The component according to claim 1, wherein the airfoil includes a cast first portion, and a second portion is secured to the first portion, the second portion providing the overhang.

6. The component according to claim 5, wherein the second portion is additively manufactured.

7. The component according to claim 1, wherein the groove is provided between the overhang and the end wall, the groove bounded by the lip.

8. The component according to claim 7, wherein the overhang substantially encloses the groove and provides an exit that fluidly interconnects the groove with the pocket.

9. The component according to claim 8, wherein the exit is provided radially between the lip and the end wall.

10. The component according to claim 1, wherein the pocket is teardrop-shaped.

11. The component according to claim 1, wherein the overhang and an adjacent wall encloses the groove.

12. A method of manufacturing a turbine blade airfoil, comprising the step of:
   (a) forming a structure having a surface configured to be exposed to a hot working fluid
   (b) forming a surface comprising a recessed pocket;
   (c) forming an overhang that circumscribes the recessed pocket which includes at least one cooling groove provided by the overhang; and
   (d) using a negative for casting of features for at least one of the steps (a)-(c) and using an additive manufacturing process to create the negative for casting of features for at least one of the steps (a)-(c); and
   wherein the forming step includes casting a first airfoil portion, and additively manufacturing a second airfoil portion onto the first airfoil portion, the second airfoil portion providing the overhang.

13. The method according to claim 12, wherein
   (e) steps (a) (c) include successively adding layers of metal powder joined by local directed energy such as direct laser metal sintering, selective laser metal melting, or electron beam melting;
   (f) step (d) comprises using an injection molded ceramic core or stamped refractory metal negative for casting of features for at least one of the steps (a)-(c); and
   (g) step (d) further includes successively adding layers of metal powder to a partially cast component for construction of at least one of the steps (a)-(c).

14. The method according to claim 13, comprising additively manufacturing at least one core that provides a cavity having an airfoil shape corresponding to the airfoil, and the forming step includes casting the airfoil within the cavity.

15. A method of manufacturing a gas turbine engine component, comprising the step of:
   forming step a first airfoil portion, and additively manufacturing a second airfoil portion onto the first airfoil portion, the second airfoil portion including a recessed pocket that is circumscribed by an overhang, and at least one cooling groove provided by the overhang.

16. The method according to claim 15, wherein the first airfoil portion is cast.

* * * * *